July 31, 1962     E. BLAHA     3,046,607
METHOD OF FORMING FUSED PARTICLES
Filed July 17, 1961
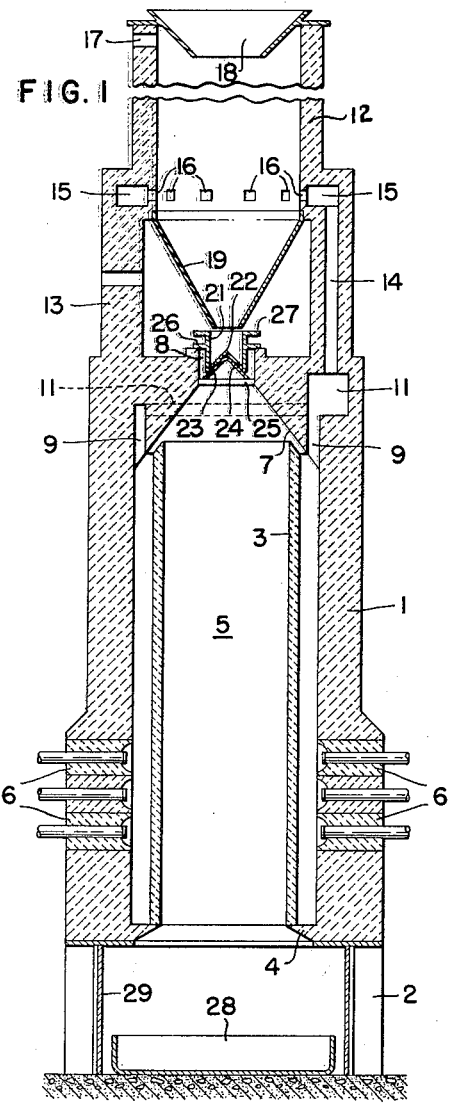
FIG. 1
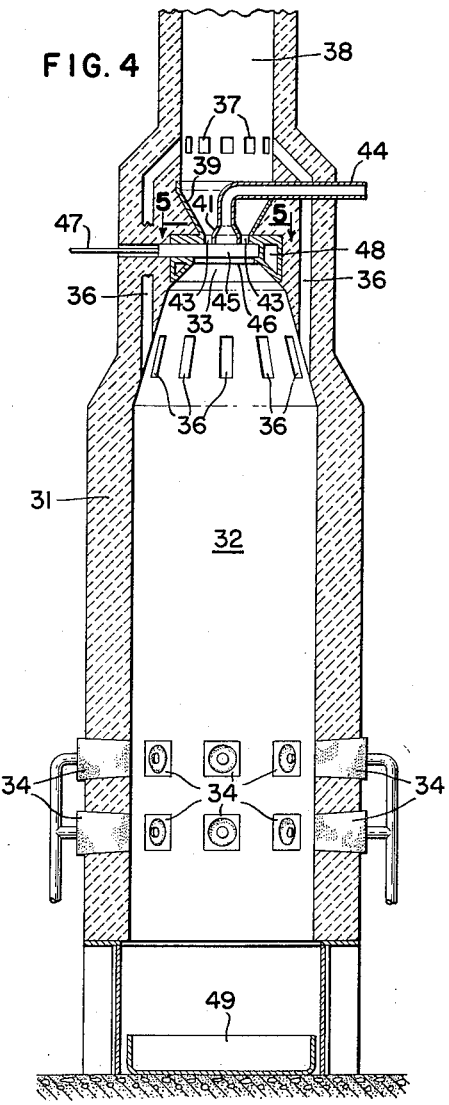
FIG. 4
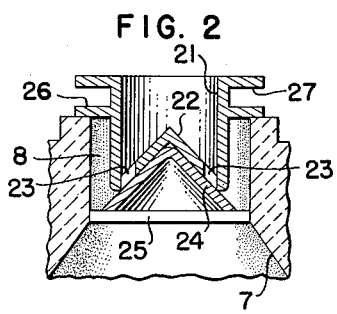
FIG. 2
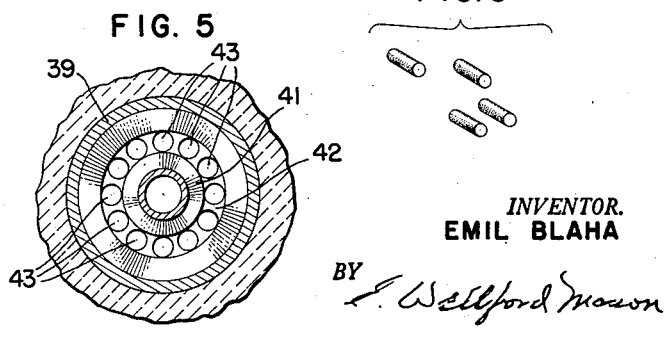
FIG. 5
FIG. 3
INVENTOR.
EMIL BLAHA
BY /s/ Wellford Mason
ATTORNEY.

United States Patent Office 3,046,607
Patented July 31, 1962

3,046,607
METHOD OF FORMING FUSED PARTICLES
Emil Blaha, Cheltenham, Pa., assignor to Selas Corporation of America, a corporation of Pennsylvania
Filed July 17, 1961, Ser. No. 127,083
14 Claims. (Cl. 18—48)

The present invention relates to the method of making small fused particles, and more particularly to a method of fusing small clay particles into hollow bodies.

It has been proposed to make hollow clay bodies for use in lightweight aggregates, but prior methods of making such bodies have proved impractical from a commercial point of view. At the present time such bodies are made by supplying clay granules of assorted sizes, and including the dust produced by attrition of the granules, into a gas stream. This gas is mixed with air and burned turbulently. The clay granules carried by the gas are heated to the temperature of fusion, and expanded into clay bodies. When the clay reaches fusion temperature its surface becomes tacky. Due to the turbulent atmosphere the tacky particles stick to each other and to the wall of the combustion chamber, with a consequent clogging of the apparatus in a short time. In addition, the clay dust swirling around in the combustion chamber absorbs an undue amount of heat and creates a sticky film on the surfaces thereof that helps to increase the speed of build up of particles on said surfaces.

A ready market is available for clay bodies of the types discussed, as well as for bodies of other materials, if a satisfactory method can be developed for making them in commercial quantities in an economical manner.

It is an object of the invention to provide a method of producing small fused objects. It is a further object of the invention to provide a method of producing hollow clay bodies.

A more specific object of the invention is to provide a method of producing cellular clay bodies for use in lightweight aggregate economically and in commercial quantities.

According to the present invention, clay particles of a substantially uniform size are introduced into the top of a vertical chamber that is heated to above the fusion temperature of the clay. As the particles are introduced into the chamber, the dust, that is created by the rubbing of the particles against each other, is removed, so that only the particles remain to fall through the chamber. The particles are introduced into the top of the chamber in an annular pattern, and fall straight downwardly. As they fall they are heated to their fusion temperature, and due to their moisture content and surface tension are expanded into hollow bodies that are usually spherical in shape. By the time they reach the bottom of the chamber they have solidified and cooled to a point where their surfaces are no longer tacky. They can then be collected for use.

One of the features of the invention is that the chamber is heated in such a fashion that the atmosphere therein is relatively quiet and thin, so that no currents are created which will be sufficient to disturb the falling pattern of the particles. Thus, there is nothing to cause the particles to deviate from their vertical path sufficiently to stick to the walls of the chamber.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a sectional view of apparatus by means of which the method can be performed, FIG. 2 is an enlarged view of a portion of FIG. 1, FIG. 3 is a view of one form that the clay pellets can take, FIG. 4 is a sectional view of another form of apparatus for performing the method, and FIG. 5 is a view on line 5—5 of FIG. 4.

Referring to the drawings there is shown a vertical cylindrical furnace 1 that is supported on a steel framework 2. The interior of this furnace is shown as being provided with a cylindrical muffle 3 that is supported in concentric relation with the furnace by means of suitable supports 4 at its lower end. The interior of the muffle is a vertically extending furnace chamber 5 forming a fusion zone through which the particles fall as they are heated to fusion temperature. The upper end of the furnace converges as shown at 7 to form an inlet opening 8 in the top thereof.

The furnace is heated by a series of burners 6 of any suitable type, but which are shown herein as being the type disclosed in Hess Patent 2,215,079, issued September 17, 1940. These burners are characterized by a supply of fuel, in the form of a combustible mixture of gas and air, being burned along a cup-shaped depression to heat the surface of the depression to incandescence, so that radiant heat is directed forwardly therefrom. In this fashion the burners heat the muffle to a temperature which is above the fusion temperature of the clay particles. The products of combustion, which are also extremely hot, rise in the space between the interior of the furnace wall and the muffle to heat this muffle for its entire length. A portion of the hot products of combustion can pass between the upper end of the muffle and the conical surface 7 forming the top of the furnace chamber to flow through the inlet 8 in a manner to be described below. The major portion of the hot products of combustion, however, are collected in a series of passages 9 that are connected by annular passage 11. These products of combustion are delivered to the interior of a preheat chamber 12 forming a preheat zone that is constructed above the furnace 1, and is supported thereon by suitable refractory work 13. The products of combustion pass from passage 11 through a passage 14 formed in the refractory structure 13 into a second annular passage 15 surrounding the lower end of the preheat chamber. This passage is provided with a plurality of openings 16 leading therefrom into the chamber. The products of combustion pass upwardly through this chamber, and are exhausted either through openings 17 provided around its periphery near the top, or through a supply fixture 18.

The clay particles that are introduced in the upper end of the preheat chamber fall through this chamber counter-flow to the rising products of combustion, and are collected in the lower end of the chamber by a cone 19 made of a suitable material. The lower end of this cone is slightly smaller in diameter than a cylindrical collector 21, which is concentric with and slightly smaller in diameter than the inlet opening 8 at the upper end of the furnace chamber. The bottom of this collector is formed as an inverted cone 22, and is provided adjacent to its periphery with a ring of openings 23 through which the clay particles can pass. When the apparatus is not operating, the collector 21 rests against a complementary cone 24, which is, as best shown in FIG. 2, large enough in diameter to close the openings 23. Therefore this member 24 acts as a stopper to control the flow of particles into the furnace chamber. It is noted that cone 24 is held in position by suitable narrow supports 25 past which the particles can fall into the furnace chamber.

Normally, a flange 26, which projects radially from the exterior of the collector, rests upon the wall surrounding opening 8 to close this opening. The collector 21 is provided with an additional flange 27 by means of which it can be raised to lift its bottom 22 away from the stopper member 29, so that particles to be fused can flow through the openings 23. When this takes place, a small portion of the products of combustion will flow up the surface 7 and through opening 8 around the collector. These products of combustion flowing at a relatively slow velocity serve the purpose of carrying away from the furnace chamber any dust that might have been produced as the clay particles rubbed against each other during their fall through the preheat chamber and their collection and discharge from the collector 21. As soon as the collector is returned to its lower position, however, all flow of products of combustion through the opening 8, as well as the flow of particles into the chamber, will be terminated.

After the particles have fallen through chamber 5, and have been fused during their fall into small hollow bodies, usually spherical in shape, they are collected in a suitable container, which is shown herein diagrammatically as a pan 28 that is located on the support for the furnace immediately below the chamber. A suitable radiation shield 29 can extend between the bottom of the furnace and its support to prevent the creation of any air currents around the bottom of the furnace, and to prevent an inflow of air to the furnace chamber, which would normally be produced by the chimney effect thereof.

In following the method, a suitable clay, which is preferably of the low melting point type, is formed into particles of the same shape and substantially the same size. This may be accomplished by screening the clay and mixing it with water to form a plastic mass. The mass may be extruded into elongated cylinders and air dried until brittle. The cylinders are then broken into short lengths. The cylinders are preferably from $1/64''$ to $1/32''$ in diameter, with those for a given run preferably being of a single diameter. The elongated cylinders are broken in short lengths of from two to ten diameters, depending upon the size body to be produced. Ordinarily, some variation in length of the cylinders is permissible, and they average about four diameters long. This insures that the particles are thin enough to have a surface-volume ratio to permit quick fusion, and at the same time provides a length which gives the particle sufficient mass to fall in a straight line. Clay particles of the type used are shown in FIG. 3.

The cylinders, which have a uniform consistency and a substantially uniform size, are used as feed stock in forming the clay bodies. The cylinders should be aerodynamically symmetrical in shape, and should have a diameter-length ratio such that they will not have a tendency to plane or glide out of a vertical path as they are falling. While the supply particles, or feed stock, are described as cylinders, the criterion is that they have such a shape that they will fall vertically. Cylinders are easy to manufacture in large quantities, but any shaped particle having the proper falling characteristics can be used.

The particles are dropped in a loose or dispersed pattern into the upper end of the preheat chamber 12, where they fall in counterflow to the hot products of combustion, so that each particle can be contacted by the hot gases. The preheat chamber is of sufficient length so that the particles are heated desirably to within a couple of hundred degrees of their fusion temperature. If it is a low melting point clay having a fusion temperature of 2100° F., an effort will be made to heat the particles to approximately 1900° F. It is desirable to heat the particles to as near the fusion point as possible. Care must be exercised, however, to make sure they do not reach a temperature where their surfaces will become tacky, or they will stick together as they are supplied to the chamber or fusion zone.

The preheated particles are collected by cone 19 and directed into collector 21. It is desirable, if not necessary, for enough particles to be supplied to collector 21 to keep it full at all times. Any surplus particles can overflow and be collected from the space between the two chambers.

When the process is operating a suitable tool or lever will be placed under flange 27 of collector 21 to raise this part above cone 24. Clay particles can then flow through openings 23, over the edge of the cone into chamber 5. As noted above, collector 21 has a row of openings 23 around it. Therefore the particles will be dropped in an annular pattern, in a plurality of streams that are slightly spaced from each other around a circle. As long as collector 21 is filled above openings 23, the particles will fall in a steady stream, and there will be no deflection of the stream. When the supply of particles gets low collector 21 should be lowered to stop the operation.

When collector 21 is raised, flange 26 is lifted so that combustion gases can flow between it and the upper edge of opening 8. As the gases flow through the annular area around the collector they will carry any dust that may have been formed from the particles upwardly out of the chamber. Thus there is a cleaning action that will remove from the chamber all dust that could float therein to absorb heat or stick to the chamber wall. It is noted that a similar dust removing action is performed by the hot gases rising through preheat chamber 12. Thus clean, dust-free particles are supplied to the fusion zone.

When in operation the burners are fired to bring the furnace chamber temperature up to approximately 2900° F. Since the burners are outside of muffle 3, that muffle will be heated by direct radiation from the burners, and by hot products of combustion flowing in a narrow space around its outer wall. The products of combustion are discharged directly through openings or passages 9. Since the products of combustion are never introduced into the chamber, and since the bottom of the chamber is closed, its atmosphere is quiescent, and there will be no air currents therein to disturb the pattern of the falling clay particles. Furthermore, because of the temperature of the chamber, the density of the air therein is considerably less than the atmosphere. This reduces resistance to falling of the particles, and reduces any tendency for them to deviate from a vertical path.

As the annular stream or column of particles falls through chamber 5, the particles are heated by heat directed inwardly from all sides by muffle 3. This heat can penetrate to the interior of the column between the individual streams falling from each opening 23. Thus, the interior, as well as the exterior of the column, is subjected to direct heat, so that each individual particle is heated. As the particles fall, they are heated from the the temperature that they have reached in the preheat chamber to fusion temperature. This takes only a fraction of a second or so, but will vary with the fusion point of the clay being used. In any event, the individual particles, as they reach fusion temperature, will become soft and their surface tension will tend to draw them into spherical shape. Ordinarily, when fusing clay, the particles will bloat and be drawn into hollow spherical bodies. Whether or not the fused bodies that are produced are hollow and spherical will depend upon the starting material and its fusion temperature. The chamber is long enough below the burners or hot zone so that as the bodies fall they will cool sufficiently so that they are no longer tacky on their surface by the time they reach the collecting pan 28. Bodies formed from cylinders $1/32''$ in diameter will be about $1/16''$ in diameter, or larger, depending upon their length and the time they are above fusion temperature.

As noted above, the individual clay particles dropped into chamber 5 do not have a tendency to plane or glide out of their vertical path. Since the particles are uniform in size and shape, they will be fused in substantially the same time. Since they fall straight, they will not be deflected against the wall of the chamber where they can build up to clog the apparatus. The straight fall of the particles is helped by the thin, quiet atmosphere within the chamber.

It has been found that the particles, when falling in a columnar pattern through the center of the furnace, will fall straighter than if they are sifted or dropped singly. Apparently the columnar pattern of falling particles pierces the atmosphere of the furnace in such a fashion that it pulls any spray particles toward the center of the furnace to assist in keeping individual particles away from the furnace wall. Whatever the reason, a columnar pattern of particles dropped through the center of the furnace is effective in helping to keep the furnace walls clean.

It will be appreciated that the time required for fusion to take place will vary with the amount of preheat imparted to the particles, their size and the fusion point of the feed material being used. For clay with a fusion temperature of 2100° F. and a furnace at 2900° F., the furnace chamber must be approximately 17 feet long.

Another form of apparatus with which the method can be carried out is shown in FIGS. 4 and 5. This form differs from that previously described in that the type of burners used do not require a muffle in the furnace and in the details of the feed mechanism.

Referring to FIGS. 4 and 5 there is shown a vertically extending cylindrical furnace 31 having an unobstructed chamber 32 that is reduced in diameter at its top to form an entrance 33. It will be noted that the entrance is substantially smaller in diameter than the body of the furnace chamber. The furnace structure has inserted in the lower portion of its wall a plurality of rings of burners 34. These burners may be like those shown in my copending application Serial No. 16,771, filed March 22, 1960, and are of the low pressure variety whose flames are "lazy." These burners may be supplied either with a combustible mixture of fuel and air, or be designed to mix separately supplied fuel and air. Burners of this type, located opposite each other in the rings of burners, serve to counteract any effect a single burner may have to move freely falling particles from the center of the furnace chamber. In fact, the inwardly moving gases from the "lazy" flames of each ring of burners act to help keep a stream of falling particles in the center of the furnace. The atmosphere in the furnace chamber 32 is like that in chamber 5 in that it is sufficiently quiet, so that particles will not be blown out of their falling pattern enough to hit the furnace wall.

The products of combustion from the burners rise in the furnace chamber and pass out of the chamber through openings 35 into passages 36. Gases passing through passage 36 discharge through openings 37 into a preheat chamber 38, similar to chamber 12 in FIG. 1, where they preheat particles on their way to furnace chamber 32.

In this form of the invention the particles to be fused are dropped into the furnace chamber in the same annular pattern used in FIG. 1, although the mechanical arrangement is slightly different. Referring to the drawing there is shown a metal structure between preheat chamber 38 and furnace chamber 32, that includes an outer conical member 39 and an inner conical member 41. The lower ends of these members are joined by a disc 42 (FIG. 5) that is pierced with a ring of openings 43 through which the particles flow. Thus the falling particles have an annular pattern in a plurality of streams that are slightly spaced from each other around a circle. Member 41 is hollow, and communicates at its upper end with a discharge pipe 44 that extends to the exterior of the structure.

Control of flow of the particles through openings 43 is obtained by a slide valve 45 that slides horizontally in a track 46 provided in the metal structure below openings 43. This valve can be moved in any suitable manner, either automatically or manually by the handle 47. It is noted that the lower portion of the metal structure can be provided with a chamber 48 through which cooling water can be circulated.

In the operation of this form of the invention particles to be heated are dropped through preheat chamber 38 counterflow to the exhausting products of combustion to accumulate in the space between cones 39 and 41. When slide valve 45 is open, the particles will fall in a vertical annular stream through openings 43 into furnace chamber 32. As the particles move downwardly through chamber 34, they are heated to their fusion temperature, and fuse into small bodies. A small portion of the furnace gases will sweep across the falling stream of particles and be exhausted through the center of cone 41 and pipe 44. These gases will carry any dust that may be traveling with the particles out of the furnace chamber.

The type and arrangement of burners 34 is such, as explained above, that the falling pattern of particles is not sufficiently disturbed to cause the particles to strike the furnace wall. This is helped by the small area of the falling column of particles relative to the area of the furnace chamber. The heated zone of the furnace is sufficiently high above a collecting pan 49, or other suitable collecting device, for the fused bodies to cool sufficiently so that their surfaces are not tacky by the time they are collected.

While the feed particles are described herein as being cylindrical in shape, it will be apparent that they could have any other shape, such as square or hexagonal, as long as their length-area ratio is such that they will fall straight. While the invention has been described in connection with the fusing and bloating of clay particles, it is not intended to be limited to the fusing of such material, since it will be apparent that the method can be used for fusing or heating other material where such treatment will be of advantage, such as refractories, glass or metal, for example.

This application is a continuation-in-part of my copending application Serial No. 9,777, filed February 19, 1960, now abandoned.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of forming fused particles which comprises dropping a plurality of non-spherical particles of substantially the same size and shape under the force of gravity through a heated zone of a furnace, introducing said particles into said zone in the form of an annular stream in the central portion only of said zone and of a size substantially smaller in area than the area of said heated zone so that the particles will be out of contact with the sides of said zone, maintaining the atmosphere in said zone still enough so that the particles will not be deflected substantially from a free falling path, heating said particles by radiant heat to above their fusion temperature as they are falling through said zone, and collecting the fused particles.

2. The method of claim 1 in which the annular stream of particles includes individual streams of particles arranged in a circle.

3. The method of forming fused particles which comprises dropping a plurality of non-spherical particles through a preheating zone in counterflow to hot gases, said particles being dispersed so that they can be contacted individually by the gases, collecting said particles and dropping them in a stream of a pattern designed to keep the particles separated through a fusion zone, removing dust from said stream of particles as they move into said fusion zone without disturbing the pattern of the stream, heating said particles above their fusion temperature as they are falling through said fusion zone, cooling said particles below their fusion temperatures at the lower end of said zone, and collecting said fused particles.

4. The method of fusing clay particles which comprises, forming the clay into particles of substantially the same size and shape, introducing said particles in an annular stream and at a substantially constant rate to the top of a fusion zone, dropping said particles vertically through the central portion only of said zone under the action of gravity, said annular stream of particles being dispersed enough so that each particle will be heated and small enough so that it will fall without contacting the side walls of said zone, maintaining the atmosphere in said zone quiescent, applying heat to said stream of particles as they are falling through said zone to raise their temperature above the fusion temperature of the clay from which the particles are formed, cooling the particles below fusion temperature, and collecting said particles below said zone.

5. The method of making hollow clay spheres which comprises forming clay cylinders of the same diameter and substantially the same length, preheating the cylinders to a temperature approaching their fusion temperature, dropping the preheated cylinders through a vertical path that is in a substantially quiet atmosphere of reduced density, removing any dust that may have accumulated from the cylinders as they are entering said path, and heating the cylinders to their fusion temperature by radiant heat as they are falling through said path to form them into hollow spheres, and collecting said spheres at the lower end of said path.

6. The method of forming hollow clay spheres which comprises forming the clay into cylindrical particles of the same diameter and substantially the same length, dropping said particles in a dispersed pattern through a preheat zone in counterflow to a current of hot gases, collecting said particles at the bottom of said zone and dropping them in an annular stream vertically downward through a fusion zone, removing any dust from the particles as they enter said fusion zone, heating the particles to above their fusion temperature by radiant heat directed inwardly from the side of the fusion zone toward all portions of the stream to cause said particles to bloat into hollow spheres, cooling said spheres below fusion temperature, and collecting said spheres.

7. The method of claim 6 in which the atmosphere in the fusion zone is maintained quiescent so that the falling pattern of the particles will not be disturbed.

8. The method of claim 6 in which the annular stream of falling particles is comprised of a plurality of individual streams arranged in a circle.

9. The method of forming fused particles from fusible material which comprises dropping a plurality of particles of said material in a vertically falling stream through a fusion zone, keeping said particles dispersed and away from the walls of said zone while they are falling, removing the dust from said particles while they are being dropped into said zone, heating said zone above fusion temperature by applying heat from around said zone toward the center thereof so that the dispersed particles will each be subjected thereto, and collecting said particles below said zone after they have become fused.

10. The method of making fused particles which comprises forming particles that have substantially the same dimensions of a material to be fused, dropping said particles under the action of gravity vertically downward through the central portion only of a heated zone of a furnace having a substantial area in a dispersed pattern of a small enough area relative to the furnace area so that the particles will not engage the walls of the furnace, heating said particles to a temperature above their fusion temperature as they are falling by heat generated in a fusion zone of the furnace around the falling particles and directed radially inwardly toward them, and collecting said particles below the fusion zone after they have become fused.

11. The method of claim 10 in which the particles are preheated to a temperature above atmospheric and below their fusion temperature prior to the time they are introduced into the furnace.

12. The method of making fused particles which comprises forming particles that have substantially the same dimensions of a material to be fused, dropping said particles under the action of gravity vertically downward through a furnace in a dispersed pattern such that the particles will not engage the walls of the furnace, removing the dust that may have accumulated with said particles as said particles are introduced into the furnace, heating said particles to a temperature above their fusion temperature as they are falling by heat generated in a fusion zone of the furnace around the falling particles and directed radially inwardly toward them and collecting said particles below the fusion zone after they have become fused.

13. The method of handling particles for fall through a furnace and making fused bodies from particles of a material which becomes tacky when heated including the steps of introducing such particles into the center of the upper end of a vertical furnace chamber in the form of an annular pattern substantially smaller in area than the area of the furnace for fall through the furnace such as to describe, by the descent of the particles, a column spaced from the interior walls of the furnace, maintaining the interior of the furnace sufficiently quiescent as substantially to maintain said pattern, and heating said particles, during their descent through the furnace, to their fusion temperature.

14. The method of making fused bodies from particles of material which become tacky when heated including the steps of introducing the particles into the upper end of a furnace in the form of a stream of particles, with a pattern so arranged with respect to the heat source as to enable substantially uniform heating of each particle, for vertical fall through the furnace, said stream of particles forming a column spaced from the interior walls of the furnace, supplying heat from the walls of the furnace inwardly toward said column to heat said particles to their fusion temperature during their descent through said furnace, and maintaining the atmosphere in the furnace sufficiently quiescent whereby the falling pattern of said particles is not substantially altered during their descent.

References Cited in the file of this patent

UNITED STATES PATENTS

| | | |
|---|---|---|
| 2,038,251 | Vogt | Apr. 21, 1926 |
| 2,044,680 | Gilbert | June 16, 1936 |
| 2,112,643 | Baensch et al. | Mar. 29, 1938 |
| 2,471,749 | Howle | May 31, 1949 |
| 2,676,892 | McLaughlin | Apr. 27, 1954 |